(12) United States Patent
Kim et al.

(10) Patent No.: US 9,191,899 B2
(45) Date of Patent: Nov. 17, 2015

(54) TERMINAL APPARATUS FOR CONTROLLING UPLINK SIGNAL TRANSMISSION POWER AND METHOD FOR SAME

(75) Inventors: Dongcheol Kim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 14/234,358

(22) PCT Filed: Sep. 5, 2012

(86) PCT No.: PCT/KR2012/007108
§ 371 (c)(1),
(2), (4) Date: Jan. 22, 2014

(87) PCT Pub. No.: WO2013/036029
PCT Pub. Date: Mar. 14, 2013

(65) Prior Publication Data
US 2014/0153534 A1    Jun. 5, 2014

Related U.S. Application Data

(60) Provisional application No. 61/531,076, filed on Sep. 5, 2011.

(51) Int. Cl.
| | |
|---|---|
| *G08C 17/00* | (2006.01) |
| *H04W 52/14* | (2009.01) |
| *H04W 52/40* | (2009.01) |
| *H04W 72/04* | (2009.01) |

(Continued)

(52) U.S. Cl.
CPC .......... *H04W 52/146* (2013.01); *H04W 52/247* (2013.01); *H04W 52/40* (2013.01); *H04W 72/0413* (2013.01); *H04B 7/022* (2013.01)

(58) Field of Classification Search
None
See application file for complete search history.

(56) References Cited

U.S. PATENT DOCUMENTS

| | | | | |
|---|---|---|---|---|
| 2010/0246705 A1* | 9/2010 | Shin et al. | ...................... | 375/267 |
| 2012/0071194 A1* | 3/2012 | Harel | ............................. | 455/522 |

(Continued)

FOREIGN PATENT DOCUMENTS

| | | |
|---|---|---|
| KR | 2011-0044683 | 4/2011 |
| KR | 2011-0055625 | 5/2011 |
| WO | 2011/017464 | 2/2011 |

OTHER PUBLICATIONS

3GPP TS36.213 V10.2.0 (Jun. 2011).*

(Continued)

*Primary Examiner* — Kwang B Yao
*Assistant Examiner* — Juvena Loo
(74) *Attorney, Agent, or Firm* — Lee, Hong, Degerman, Kang & Waimey

(57) ABSTRACT

A terminal apparatus for controlling uplink signal transmission power and a method for same are disclosed. A method for the terminal, which communicates with a plurality of cooperation nodes that are controlled by one base station in one cell, controlling the uplink signal transmission power in a wireless communication system comprises the steps of: receiving diversity gain information of the plurality of cooperation nodes; determining the uplink transmission power of the uplink signal by considering the diversity gain information; and transmitting the uplink signal at the uplink transmission power that is decided, wherein the diversity gain information is an offset value which considers a diversity margin of the plurality of cooperation nodes.

18 Claims, 10 Drawing Sheets

(51) Int. Cl.
*H04W 52/24* (2009.01)
*H04B 7/02* (2006.01)

(56) References Cited

U.S. PATENT DOCUMENTS

| | | | |
|---|---|---|---|
| 2012/0188947 A1* | 7/2012 | Larsson et al. | 370/328 |
| 2012/0224552 A1* | 9/2012 | Feuersanger et al. | 370/329 |
| 2012/0236741 A1* | 9/2012 | Xu et al. | 370/252 |
| 2013/0044665 A1* | 2/2013 | Ng et al. | 370/311 |
| 2013/0058315 A1* | 3/2013 | Feuersanger et al. | 370/336 |

OTHER PUBLICATIONS

PCT International Application No. PCT/KR2012/007108, Written Opinion of the International Searching Authority dated Jan. 24, 2013, 16 pages.
PCT International Application No. PCT/KR2012/007108, Written Opinion of the International Searching Authority dated Jan. 24, 2013, 11 pages.

* cited by examiner (a)

(b)

TERMINAL APPARATUS FOR CONTROLLING UPLINK SIGNAL TRANSMISSION POWER AND METHOD FOR SAME

CROSS-REFERENCE TO RELATED APPLICATIONS

This application is the National Stage filing under 35 U.S.C. 371 of International Application No. PCT/KR2012/007108, filed on Sep. 5, 2012, which claims the benefit of U.S. Provisional Application Ser. No. 61/531,076, filed on Sep. 5, 2011, the contents of which are all hereby incorporated by reference herein in their entirety.

TECHNICAL FIELD

The present invention relates to a wireless access communication system, and more particularly, to an apparatus and method for controlling transmission power.

BACKGROUND ART

Most important requirements of next-generation wireless access systems are to support high data throughput. For this, a variety of technologies such as MIMO (multiple input multiple output), CoMP (cooperative multiple point transmission), relay, etc. have been developed.

Conventional wireless access systems consider only a single carrier although different bandwidths are configured for uplink and downlink. For example, there has been provided a single carrier based wireless communication system in which uplink and downlink are respectively composed of a single carrier and an uplink bandwidth and a downlink bandwidth are symmetrical.

To secure a wide bandwidth for satisfying higher data throughput in consideration of saturated frequency resources, carrier aggregation (CA) (multiple cells), which aggregates a plurality of dispersed bandwidths and is designed to satisfy basic requirements that independent systems are respectively operated using the bandwidths, has been introduced.

Here, a carrier for a bandwidth, which can be independently operated, is referred to as a component carrier (CC). To support increasing transmission capacity, 3GPP LTE-A or 802.16m extends the bandwidth thereof to 20 MHz or more. In this case, one or more component carriers are aggregated to support a wide bandwidth. For example, if one component carrier supports a bandwidth of 5 MHz, 10 MHz or 20 MHz, a maximum of five component carriers are aggregated to support a system bandwidth of up to 100 MHz.

DISCLOSURE

Technical Problem

An object of the present invention devised to solve the problem lies in a power control method for controlling interference and improving system performance when uplink/downlink communication is performed between macro cells or between nodes/points in a macro cell.

Another object of the present invention is to provide a terminal apparatus for controlling transmission power.

Technical Solution

The object of the present invention can be achieved by providing a method for a terminal to control transmission power in a wireless communication system in consideration of diversity gain.

According to one aspect of the present invention, a method for controlling uplink transmit (Tx) power of a terminal communicating with a plurality of cooperation nodes controlled by one base station in one cell in a wireless communication system includes: receiving diversity gain information of the plurality of cooperation nodes; determining uplink Tx power of an uplink signal in consideration of the diversity gain information; and transmitting the uplink signal with the determined uplink Tx power, wherein the diversity gain information is an offset value considering a diversity margin of the plurality of cooperation nodes.

The diversity gain information of the plurality of cooperation nodes may be signaled from the plurality of cooperation nodes.

The plurality of cooperation nodes may be remote radio heads (RRHs) or wired antennas of a distributed antenna system (DAS).

When the uplink signal is a physical uplink shared channel (PUSCH), the determined uplink Tx power may correspond to the following equation A $$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin} \end{cases} \quad \text{[Equation A]}$$

wherein c indicates the index of the specific cell, i represents a subframe index, $P_{PUSCH,c}(i)$ is PUSCH Tx power in the subframe i of the specific cell c, $P_{CMAX,c}(i)$ is maximum Tx power of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF_c}(i)$ is a value for one codeword of the specific cell c, and $\text{offset}_{BS\_Diversity\_margin}$ is transmission/reception diversity between base stations of the terminal.

When the uplink signal is a PUSCH and the PUSCH and a PUCCH are simultaneously transmitted, the determined uplink Tx power may correspond to the following equation B $$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin} \end{cases}$$ [Equation B]

wherein c indicates the index of the specific cell, i represents a subframe index, $P_{PUSCH,c}(i)$ is PUSCH Tx power in the subframe i of the specific cell c, $\hat{P}_{PUCCH,c}(i)$ is the linear value of PUCCH Tx power, $\hat{P}_{CMAX,c}(i)$ is the linear value of maximum Tx power $P_{CMAX,c}(i)$ of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF,c}(i)$ is a value for one codeword of the specific cell c, and $\text{offset}_{BS\_Diversity\_margin}$ is transmission/reception diversity between base stations of the terminal.

A power headroom corresponding to Tx power usable as the uplink signal may conform to the following equation C $$PH_{type1,c}(i) = P_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin}\}$$ [Equation C]

wherein c indicates the index of the specific cell, i represents a subframe index, $PH_{Type1,c}(i)$ is power headroom power in the subframe i of the specific cell c, $P_{CMAX,c}(i)$ is maximum Tx power of the terminal, $M_{PUSCH,c}(i)$ is a parameter indicating a PUSCH resource allocation bandwidth represented by the number of effective resource blocks for the subframe i of the specific cell c, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF_c}(i)$ is a value for one codeword of the specific cell c, and $\text{offset}_{BS\_Diversity\_margin}$ is transmission/reception diversity between base stations of the terminal.

When the uplink signal is a physical uplink control channel (PUCCH), the determined uplink Tx power may correspond to the following equation D $$P_{PUCCH}(i) =$$ [Equation D]
$$\min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) - \text{offset}_{BS\_Diversity\_margin} \end{cases}$$

wherein c indicates the index of the specific cell, i represents a subframe index, $P_{PUCCH}(i)$ is PUCCH Tx power in the subframe i of the specific cell c, $P_{CMAX,c}(i)$ is maximum Tx power of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $h(n_{CQI}, n_{HARQ}, n_{SR})$ is a value varied according to PUCCH format, $n_{CQI}$ represents the number of information bits of channel quality information (CQI), $n_{HARQ}$ represents the number of HARQ bits, $n_{SR}$ is a value indicating whether a specific subframe has a PUSCH transport block, $\Delta_{F\_PUCCH}(F)$ is a relative value for PUCCH format 1a, g(i) is a value indicating a current PUCCH power control adjustment state of the subframe i, $\Delta_{TxD}(F')$ is a value determined by a higher layer in which PUCCH format F' is defined when the PUCCH is configured by the terminal such that the PUCCH is transmitted through two antenna ports, and $\text{offset}_{BS\_Diversity\_margin}$ is transmission/reception diversity between base stations of the terminal.

When the uplink signal is a sounding reference symbol (SRS), the determined uplink Tx power may correspond to the following equation E $$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i) - \text{offset}_{BS\_Diversity\_margin}\}$$ [Equation E]

wherein c indicates the index of the specific cell, i represents a subframe index, $P_{SRS,c}(i)$ is SRS Tx power in the subframe i of the specific cell c, $P_{CMAX,c}(i)$ is maximum Tx power of the terminal, $P_{SRS\_OFFSET,c}(m)$ is a UE-specific parameter corresponding to a power offset value for SRS transmission of the specific cell c, $M_{SRS,c}$ is SRS transmission bandwidth represented by the number of resource blocks, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, and $\text{offset}_{BS\_Diversity\_margin}$ is transmission/reception diversity between base stations of the terminal.

When the uplink signal is a random access channel (RACH), the determined uplink Tx power may correspond to the following equation F $$P_{PRACH} = \min\{P_{CMAX,c}(i), \text{PREAMBLE\_RECEIVED\_TARGET\_POWER} + PL_c - \text{offset}_{\_BS\_Diversity\_margin}\}$$ [Equation F]

wherein c indicates the index of the specific cell, i represents a subframe index, $P_{PRACH}$ is RACH Tx power in the subframe i of the specific cell c, PREAMBLE_RECEIVED_TARGET_POWER represents receive (Rx) power of a RACH preamble targeted by a BS, $PL_c$ is a downlink pathloss estimate calculated in dB by the terminal of the specific cell c, and $\text{offset}_{BS\_Diversity\_margin}$ is transmission/reception diversity between base stations of the terminal.

In another aspect of the present invention, provided herein is a terminal communicating with a plurality of cooperation nodes controlled by one base station in one cell, for controlling uplink Tx power in a wireless communication system, the terminal including: a processor configured to control a transceiver to receive diversity gain information of the plurality of cooperation nodes, to determine uplink Tx power of an uplink signal in consideration of the diversity gain information and to control the transceiver to transmit the uplink signal with the determined uplink Tx power, wherein the diversity gain information is an offset value considering a diversity margin of the plurality of cooperation nodes.

Advantageous Effects

According to the method for controlling transmission power, transmission power of a terminal can be set when a plurality of nodes is present in a macro cell.

In addition, when a terminal communicates with base stations, nodes or antennas, which are geographically separated from the terminal, for transmission/reception of signals to/from the same, the terminal has benefits in transmission/reception performance. When the benefits are applied to transmission power of base stations or the terminal, the terminal can maintain the performance thereof and interference can be reduced, improving system performance. Furthermore, battery life can increase in terms of power consumption.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, even if the following description is made based on a wireless communication system corresponding to 3GPP LTE/LTT-A, the present invention is applicable to other wireless communication systems except for specific features of 3GPP LTE/LTE-A.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, a terminal refers to mobile or fixed user equipment such as UE (user equipment), MS (mobile station), AMS (advanced mobile station), etc. While the present invention is described based on 3GPP LTE/LTE-A, the present invention is applicable to other communication systems.

In a wireless communication system, a UE can receive information through downlink from a base station and transmit information through uplink to the base station. Information transmitted or received by the UE includes data and various types of control information. Various physical channels are present according to types and purposes of information transmitted or received by the UE.

Figure 1:
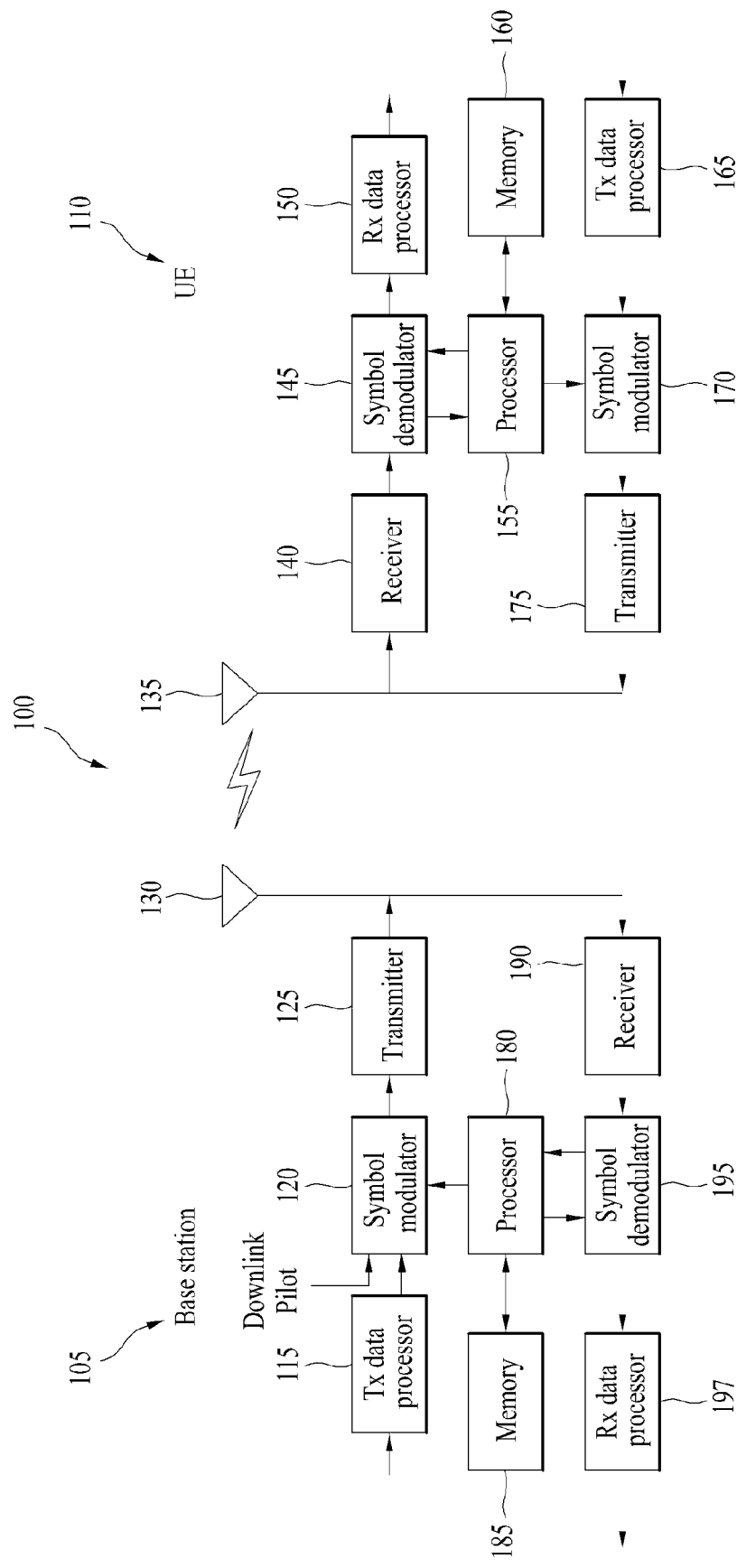
FIG. 1 is a block diagram illustrating configurations of a base station 105 and a terminal 110 in a wireless communication system 100.

FIG. 1 is a block diagram illustrating configurations of a base station (BS) 105 and a UE 110 in a wireless communication system 100.

While one BS 105 and one UE 110 are illustrated in FIG. 1 in order to represent the wireless communication system 100 in a simplified way, the wireless communication system 100 may include one or more BSs and/or one or more UEs.

Referring to FIG. 1, the BS 105 can include a transmission (Tx) data processor 115, a symbol modulator 120, a transmitter 125, a transmit/receive (Tx/Rx) antenna 130, a processor 280, a memory 285, a receiver 290, a symbol demodulator 295 and a reception (Rx) data processor 297. The UE 110 can include a Tx data processor 165, a symbol modulator 170, a transmitter 175, a Tx/Rx antenna 135, a processor 155, a memory 160, a receiver 140, a symbol demodulator 145 and a Rx data processor 150. While the Tx/Rx antennas 130 and 135 are each shown as a single antenna in the BS 105 and the UE 110, the BS 205 and the UE 210 include multiple Tx/Rx antennas. Hence, the BS 105 and the UE 110 according to the present invention support MIMO (Multiple Input Multiple Output). Furthermore, the BS 105 may support both single user-MIMO (SU-MIMO) and multi-user-MIMO (MU-MIMO) in the present invention. On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

The symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the Tx antenna 130.

The UE 110 receives the downlink signal from the BS through the Rx antenna 135 and provides the received downlink signal to the receiver 140. The receiver 140 processes the downlink signal (for example, through filtering, amplification and frequency downconversion) and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On the uplink, in the UE 210, the Tx data processor 165 outputs data symbols by processing received traffic data. The symbol modulator 170 multiplexes the data symbols received from the Tx data processor 165 with pilot symbols, modulates the multiplexed symbols and outputs a stream of the symbols to the transmitter 175. The transmitter 175 generates an uplink signal by processing the symbol stream and transmits the uplink signal to the BS 105 through the Tx antenna 135.

The BS 105 receives the uplink signal from the UE 110 through the Rx antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180.

When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 255 and 280.

The layers of radio interface protocols between a UE/BS and a wireless communication system (network) may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/BS and the wireless communication network exchange RRC messages through the RRC layer.

Figure 2:
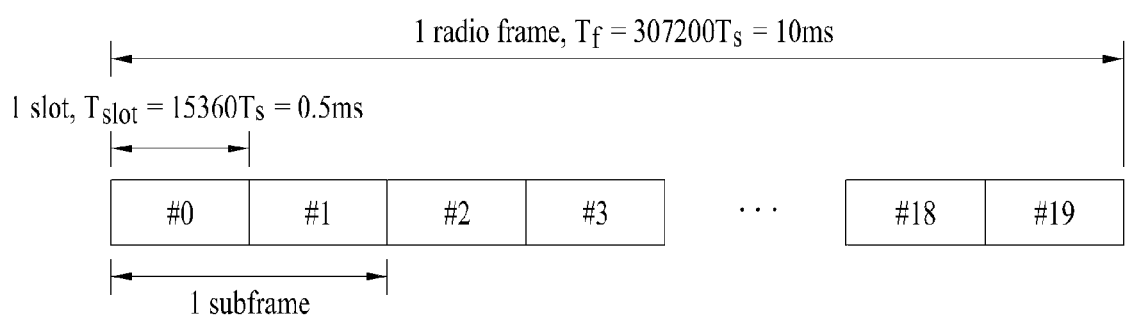
FIG. 2 illustrates a radio frame structure for use in 3GPP LTE.

FIG. 2 illustrates a radio frame structure for use in 3GPP LTE which is a mobile communication system.

Referring to FIG. 2, a radio frame has a duration of 10 ms (327200 Ts) and is composed of 10 subframes of equal size. Each subframe is 1 ms in duration and consists of 2 slots. Each slot is 0.5 ms (15360 Ts) in duration. Here, Ts is sampling time and is represented by Ts=1/(15 kHz×2048)=3.2552× $10^{-8}$ (about 33 ns). A slot includes a plurality of orthogonal frequency division multiplexing (OFDM) symbols or single carrier-frequency division multiple access (SC-FDMA) symbols in the time domain and includes a plurality of resource blocks (RBs) in the frequency domain.

In LTE, one RB includes 12 subcarrier×7(6) OFDM symbols or SC-FDMA symbols. A transmission time interval (TTI), a unit time for which data is transmitted, can be determined as one or more subframes. The above-described radio frame structure is exemplary and the number of subframes included in a radio frame, the number of slots included in a subframe and the number of OFDM symbols or SC-FDMA symbols included in a slot can be varied.

Figure 3:
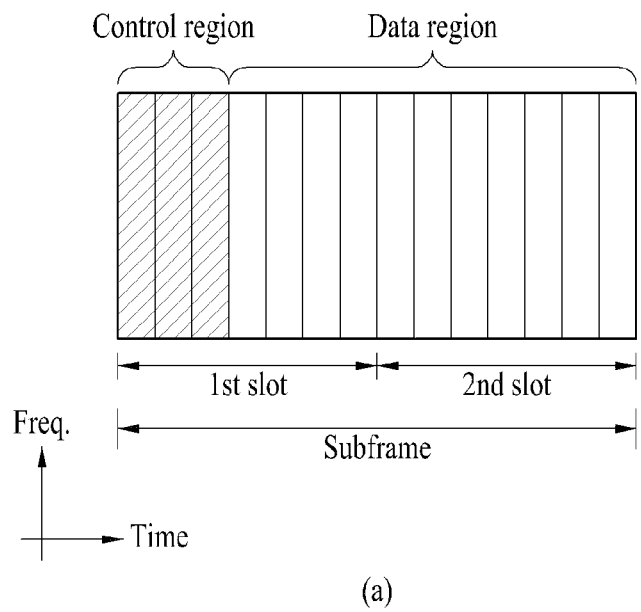
FIG. 3 illustrates a downlink subframe structure and an uplink subframe structure of 3GPP LTE.
Figure 3:
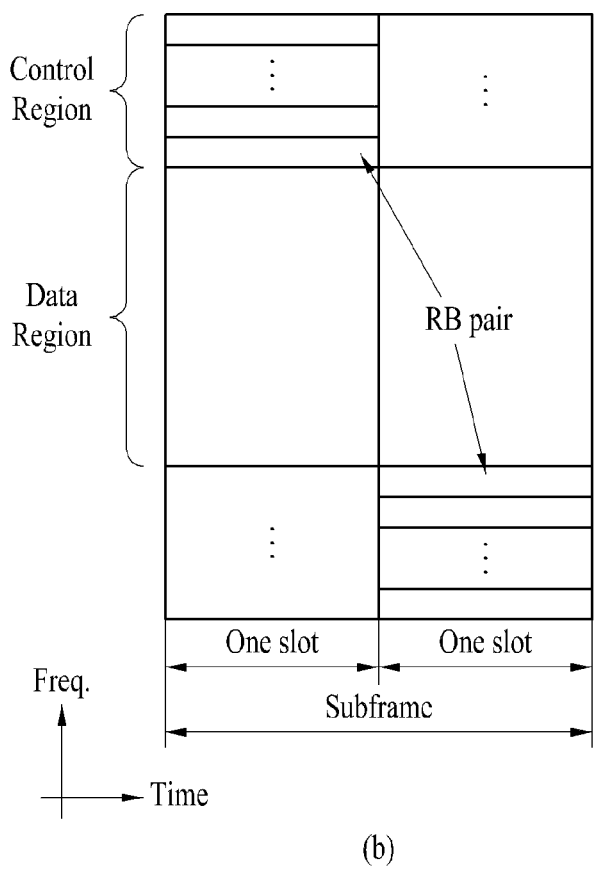

FIG. 3 illustrates a downlink subframe structure and an uplink subframe structure of 3GPP LTE which is a mobile communication system.

Referring to FIG. 3(a), a downlink subframe includes 2 slots in the time domain. Three OFDM symbols located at the beginning of the first slot of a downlink subframe correspond to a control region to which control channels are allocated and the remaining OFDM symbols correspond to a data region to which a physical downlink shared channel (PDSCH) is allocated.

Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols (i.e. control region size) used for transmission of control channels within the subframe. Control information transmitted through the PDCCH is referred to as downlink control information (DCI). The DCI refers to uplink resource allocation information, downlink resource allocation information, an uplink Tx power control command for UE groups, etc. The PHICH carries an acknowledgment(ACK) (ACK)/negative-acknowledgment (NACK) signal for uplink hybrid automatic repeat request (HARQ). That is, an ACK/NACK signal for uplink data transmitted by a UE is transmitted on the PHICH. The PDCCH will now be described.

A BS can transmit, through the PDCCH, resource allocation information and transmission format of a PDSCH (which may be referred to as a DL grant), resource allocation information of a PUSCH (which may be referred to as a UL grant), a set of transmit power control (TPC) commands on individual UEs within an arbitrary UE group, activation of a voice over Internet protocol (VoIP), etc. The BS can transmit a plurality of PDCCHs within a control region and a UE can monitor the PDCCHs. The PDCCH includes an aggregate of one or several consecutive control channel elements (CCEs). The BS can transmit the PDCCH including the aggregate of one or several CCEs in the control region after subblock interleaving of the PDCCH. A CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information carried on the PDCCH is called downlink control information (DCI). Table 1 shows DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 conveys uplink resource allocation information, DCI format 1 to DCI format 2 are used to indicate downlink resource allocation information, and DCI format 3 and DCI format 3A indicate uplink transmit power control (TPC) command for UE groups. DCI formats 3/3A include TPC commands for a plurality of UEs. In the case of DCI formats 3/3A, a BS masks CRC with TPC-ID. The TPC-ID is an identifier demasked by a UE to monitor a PDCCH carrying a TPC command. The TPC-ID is used for the UE to decode the PDCCH in order to check whether the TPC command is carried on the PDCCH. The TPC-ID may be defined by reusing the existing identifier such as C-RNTI (radio network temporary identifier), PI-RNTI, SC-RNTI or RA-RNTI or defined as a new identifier. The TPC-ID is distinguished from the C-RNTI for a specific UE and the PI-RNTI, SC-RNTI and RA-RNTI for all UEs in a cell since the TPC-ID is an identifier for UEs belonging to a specific set in a cell. This is because only N UEs can receive TPC commands therefor if DCI includes the TPC commands for the N UEs. If the DCI includes TPC commands for all UEs in a cell, the TPC-ID becomes an identifier for all UEs in the cell.

A UE searches a search space in a subframe for the TPC-ID by monitoring a set of PDCCH candidates. Here, the UE may search a common search space or a UE-specific search space for the TPC-ID. The common search space refers to a search space searched by all UEs in a cell whereas the UE-specific search space refers to a search space searched by a specific UE. If the TPC-ID is demasked for a corresponding PDCCH candidate and thus a CRC error is not detected, the UE can receive a corresponding TPC command on the PDCCH.

TPC-ID for a PDCCH that carries a plurality of TPC commands is defined. Upon detection of the TPC-ID, a UE receives a TPC command on a PDCCH corresponding to the TPC-ID. The TPC command is used to control uplink channel transmit power. Accordingly, it is possible to prevent failure of transmission to a BS or interference to other UEs due to wrong power control.

A method of mapping resources by a BS for PDCCH transmission in an LTE system is described briefly.

In general, the BS can transmit scheduling allocation information and other control information through a PDCCH. A physical control channel may be transmitted through an aggregation of one or more contiguous CCEs. A CCE includes 9 resource element groups (REGs). The number of REGs which are not allocated to a PCFICH or PHICH is represented by NREG. CCEs that can be used in the system correspond to 0 to NCCE-1 (here, $N_{CCE} = \lfloor N_{REG}/9 \rfloor$). A PDCCH supports multiple formats as shown in the following table 2. A PDCCH composed of n contiguous CCEs starts from a CCE that performs i mod n=0 (here, i is a CCE number). Multiple PDCCHs may be transmitted through one subframe.

TABLE 2

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, the BS can determine a PDCCH format on the basis of the number of regions in which the BS will transmit control information. A UE can reduce overhead by reading the control information on a CCE basis.

Referring to FIG. 3(b), an uplink subframe can be divided in the frequency domain into a control region and a data region. The control region is allocated a PUCCH for carrying uplink control information. The data region is allocated a PUSCH for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. The RB pair allocated to the PUCCH is frequency-hopped in a slot boundary.

Figure 4:
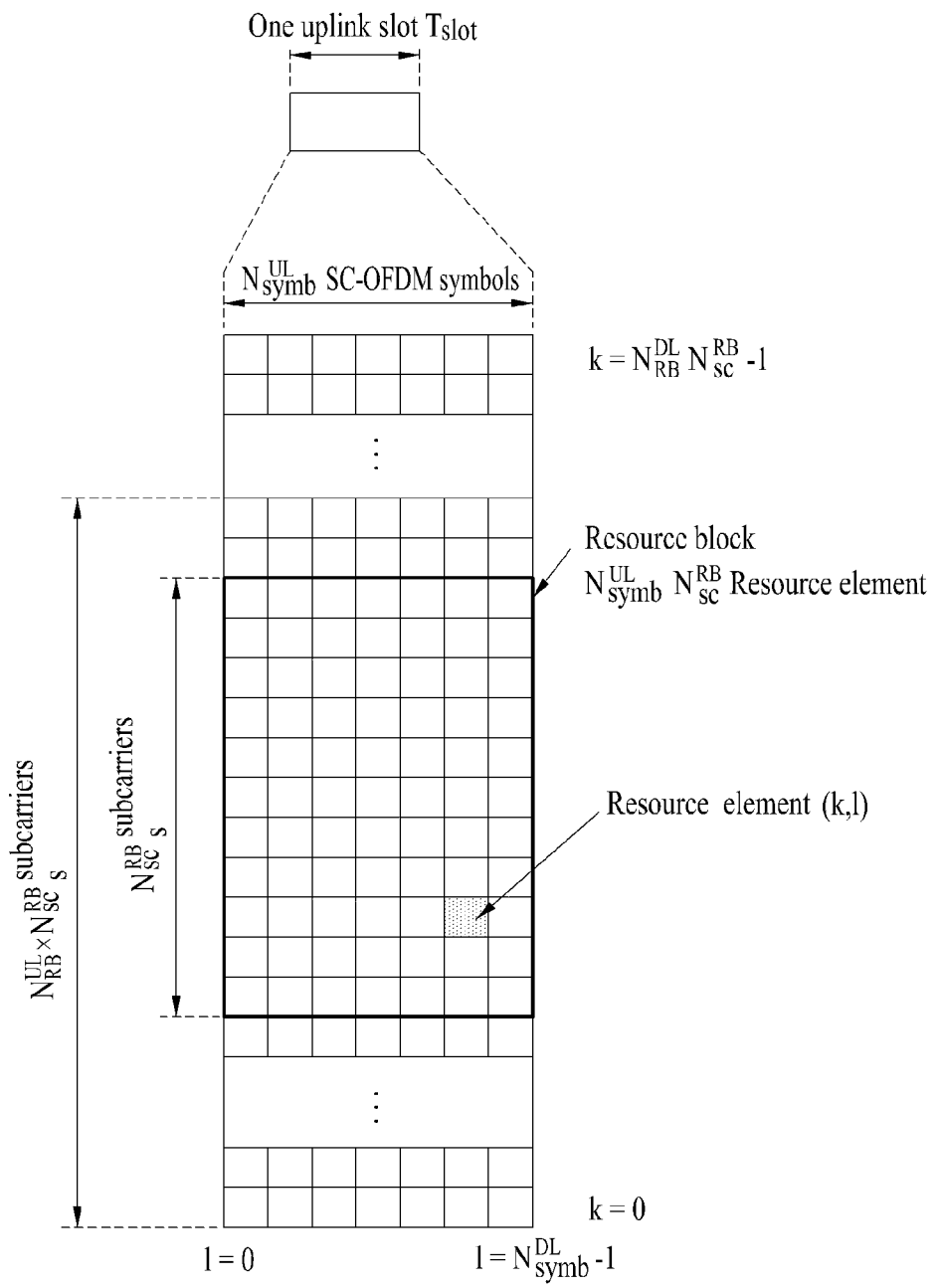
FIG. 4 illustrates a time-frequency resource grid structure of downlink in 3GPP LTE.

FIG. 4 shows a downlink time-frequency resource grid structure used in 3GPP LTE.

A downlink signal transmitted in each slot may be described by a resource grid including $N_{RB}^{DL} \times N_{SC}^{RB}$ subcarriers and $N_{symb}^{DL}$ OFDM symbols. $N_{RB}^{DL}$ indicates the number of downlink resource blocks (RBs), $N_{SC}^{RB}$ represents the number of subcarriers which configure one RB, and $N_{symb}^{DL}$ indicates the number of OFDM symbols in one downlink slot. $N_{RB}^{DL}$ depends on a downlink transmission bandwidth set in a corresponding cell and needs to satisfy $N_{RB}^{min,DL} \leq N_{RB}^{DL} \leq N_{RB}^{max,DL}$. Here, $N_{RB}^{min,DL}$ indicates a minimum downlink bandwidth supported by a wireless communication system, and $N_{RB}^{max,RB}$ represents a maximum downlink bandwidth supported by the wireless communication system. While $N_{RB}^{min,DL}$ may be 6 and $N_{RB}^{max,RB}$ may be 110, they are not limited thereto. The number of OFDM symbols included in one slot may depend on the length of cyclic prefix (CP) and a subcarrier interval. In case of multi-antenna transmission, one resource grid can be defined per antenna port.

An element in the resource grid for each antenna port is called a resource element (RE) and uniquely identified by an index pair (k, l) in a slot. Here, k indicates a frequency-domain index ranging from 0 to $N_{RB}^{DL}N_{SC}^{RB}-1$, and l indicates a time-domain index ranging from 0 to $N_{symb}^{DL}-1$.

A RB shown in FIG. 4 is used to describe the mapping relationship between a physical channel and REs. RBs may be classified into a physical RB (PRB) and a virtual RB (VRB). One PRB is defined as $N_{symb}^{DL}$ consecutive OFDM symbols in the time domain and $N_{SC}^{RB}$ consecutive subcarriers in the frequency domain. Here, $N_{symb}^{DL}$ and $N_{SC}^{RB}$ may be predetermined values. For example, $N_{symb}^{DL}$ and $N_{SC}^{RB}$ may have values as shown in the following table 3. Accordingly, one PRB includes $N_{symb}^{DL} \times N_{SC}^{RB}$ REs. While one PRB can correspond to one slot in the time domain and correspond to 180 kHz in the frequency domain, it is not limited thereto.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

One PRB has a value in the range of 0 to $N_{RB}^{DL}-1$ in the frequency domain. The relationship between a PRB number $n_{PRB}$ in the frequency domain and a resource element (k, l) in one slot satisfies $$n_{PRB} = \left\lfloor \frac{k}{N_{sc}^{RB}} \right\rfloor.$$

The VRB has a size equal to the PRB. The VRB can be classified into a localized VRB (LVRB) and a distributed VRB (DVRB). For each VRB type, a pair of VRBs in two slots of one subframe are allocated with a single VRB number $n_{VRB}$.

The VRB may have a size equal to the PRB. The VRB is classified into a LVRB and a DVRB. For each of the LVRB and DVRB, a pair of VRB having a single VRB index (which may be referred to as a VRB number) are allocated to two slots in one subframe. In other words, $N_{RB}^{DL}$ VRBs which belong to the first one of two slots in one subframe are allocated one of indexes in the range of 0 to $N_{RB}^{DL}-1$ and $N_{RB}^{DL}$ VRBs which belong to the second slot are also allocated one of the indexes in the range of 0 to $N_{RB}^{DL}-1$.

A description will be given of a procedure through which a BS transmits a PDCCH to a UE in LTE.

The BS determines a PDCCH format according to DCI to be transmitted to the UE and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information, a system information RNTI (SI-RNTI) may be masked to the CRC. When the PDCCH is for a random access response, a random access-RNTI (RA-RNTI) may be masked to the CRC. Table 4 shows examples of identifiers masked to the PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

The PDCCH carries control information for a specific UE corresponding thereto if the C-RNTI is used and carries common control information received by all UEs or a plurality of UEs in a cell if other RNTIs are used. The BS performs channel coding on the DCI to which the CRC is attached to generate coded data. Then, the BS performs rate matching based on the number or CCEs allocated to the PDCCH format. Subsequently, the BS modulates the coded data to generate modulated symbols and maps the modulated symbols to physical resource elements.

Figure 5:
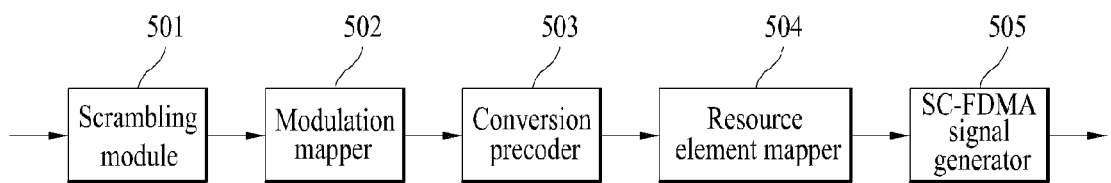
FIG. 5 illustrates a signal processing procedure through which a terminal transmits an uplink signal.

FIG. 5 illustrates a signal processing procedure through which a UE transmits an uplink signal.

Referring to FIG. 5, a scrambling module 501 of the UE may scramble a transmission signal using a UE-specific scrambling signal in order to transmit the uplink signal. The scrambled signal is input to a modulation mapper 502 is modulated into complex symbols using binary phase shift keying (BPSK), quadrature phase shift keying (QPSK) or 16-quadrature amplitude modulation (16QAM)/64QAM on the basis of transmission signal type and/or channel state. The complex symbols are processed by a transform precoder 503 and then applied to a resource element mapper 504. The resource element mapper 504 can map the complex symbols to time-frequency resource elements. The signal processed in this manner can pass through a SC-FDMA signal generator 550 and then transmitted to the BS through an antenna.

A description will be given of PUCCH formats and uplink transmit power of UEs, defined in LTE Release-8. A PUCCH carries uplink control information. In LTE, a UE cannot simultaneously transmit the PUCCH and a PUSCH due to the single carrier property. In LTE-A, however, the UE may simultaneously transmit the PUCCH and the PUSCH through a specific component carrier (e.g. a primary component carrier or PCell) according to introduction of multiple carriers. The PUCCH supports a plurality of formats and PUCCH formats supported in LTE Release-8 are shown in the following table 5. PUCCH formats 2a and 2b support normal CP only.

TABLE 5

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |

TABLE 5-continued

| PUCCH format | Modulation scheme | Number of bits per subframe, $M_{bit}$ |
|---|---|---|
| 2a | QPSK + BPSK | 21 |
| 2b | QPSK + QPSK | 22 |

Equation 1 represents uplink Tx power for uplink control channel transmission of a UE in LTE Release-8 in dBm.

$$P_{PUCCH}(i) = \min\{P_{CMAX}, P_{O\_PUCCH} + PL + h(n_{CQI}, n_{HARQ}) + \Delta_{F\_PUCCH}(F) + g(i)\}$$ [Equation 1]

Here, i indicates a subframe index, $P_{CMAX}$ represents maximum Tx power of the UE, $P_{O\_PUCCH}$ is a parameter including the sum of cell-specific parameters and is signaled by a BS through higher layer signaling, PL is a downlink pathloss (or signal loss) estimate calculated in dB by the UE and is represented as PL=referenceSignalPower-higher layer filteredRSRP. In addition, h(n) is a value varying according to PUCCH format, $n_{CQI}$ is number information bit for channel quality information (CQI) and $n_{HARQ}$ indicates the number of HARQ bits. $\Delta_{F\_PUCCH}(F)$ represents is a relative value for PUCCH format 1a, corresponds to PUCCH format (F) and is signaled by the BS through higher layer signaling, and g(i) indicates a current PUCCH power control adjustment state of a subframe with index i. Furthermore, $h(n_{CQI}, n_{HARQ})$ is 0 in PUCCH formats 1, 1a and 1b and can be represented by Equation 2 in the case of normal CP.

$$h(c_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases}$$ [Equation 2]

Table 6 shows $\delta_{PUCCH}$ mapped to TPC command fields in DCI formats 1A/1B/1D/1/2A/2/3 and Table 7 shows $\delta_{PUCCH}$ mapped to TPC command fields in DCI format 3A. Here, $\delta_{PUCCH}$ represents a UE-specific correction value (or power correction value).

TABLE 6

| TPC Command Field in DCI format 1A/1B/1D/1/2A/2B/2/3 | $\delta_{PUCCH}$ [dB] |
|---|---|
| 0 | −1 |
| 1 | 0 |
| 2 | 1 |
| 3 | 3 |

TABLE 7

| TPC Command Field in DCI format 3A | $\delta_{PUCCH}$ [dB] |
|---|---|
| 0 | −1 |
| 1 | 1 |

FIGS. 6(a) to 8(b) illustrate multiple carriers of a BS and multiple carriers of a UE.

Environments considered in the present invention include general multi-carrier supporting environments. That is, a multi-carrier system or a carrier aggregation system described in the present invention refers to a system using an aggregate of one or more carriers each having a bandwidth narrower than a target bandwidth to support a wide band. When one or more carriers each having a bandwidth narrower than the target bandwidth are aggregated, the bandwidths of aggregated carriers may be limited to the bandwidth used in the legacy IMT systems for backward compatibility with the legacy IMT system. For example, 3GPP LTE supports {1.4, 3, 5, 10, 15, 20}MHz and LTE-A supports bandwidths wider than 20 MHz only using the bandwidths supported by LTE. Alternatively, a new bandwidth may be defined to support carrier aggregation irrespective of bandwidths used in legacy systems.

The term 'multiple carriers' can be used interchangeably with carrier aggregation and bandwidth (BW) aggregation. Carrier aggregation includes contiguous carrier aggregation, non-contiguous carrier aggregation and spectrum aggregation.

A description will be given of a scheme of managing multiple carriers by one MAC in order to efficiently use the multiple carriers. A transmitter and a receiver for the scheme are respectively shown in FIG. 6(a) and FIG. 6(b). For effective transmission/reception of the multiple carriers, both the transmitter and receiver need to transmit/receive multiple carriers.

One MAC manages/operates and transmits/receives one or more frequency carriers. Since the frequency carriers managed by one MAC need not be contiguous, resource management is flexible. Both contiguous carrier aggregation and non-contiguous aggregation can be performed.

Figure 6A:
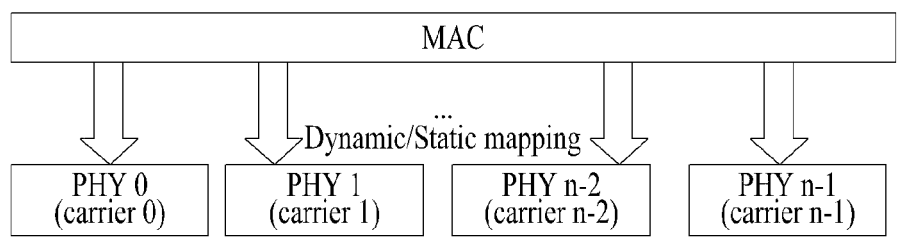
FIG. 6(a) illustrates multiple carriers of a base station.
Figure 6B:
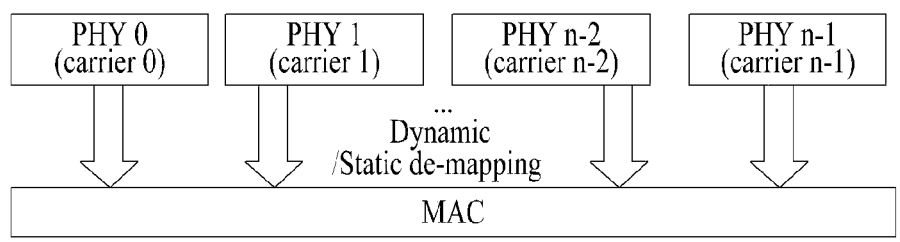
FIG. 6(b) illustrates multiple carriers of a terminal.

In addition to the scheme illustrated in FIGS. 6(a) and 6(b), multiple MACs may control multiple PHYs, as shown in FIGS. 7(a), 7(b), 8(a) and 8(b).

Figure 7A:
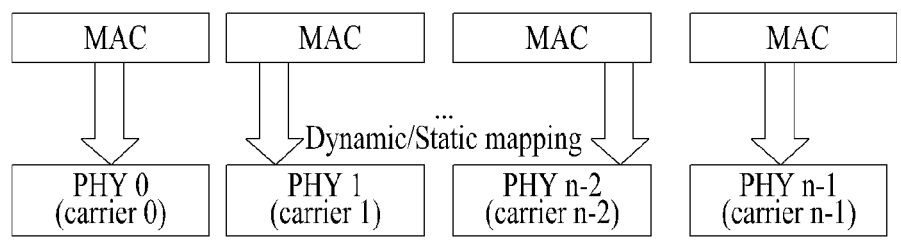
FIG. 7(a) illustrates multiple carriers of a base station.
Figure 7B:
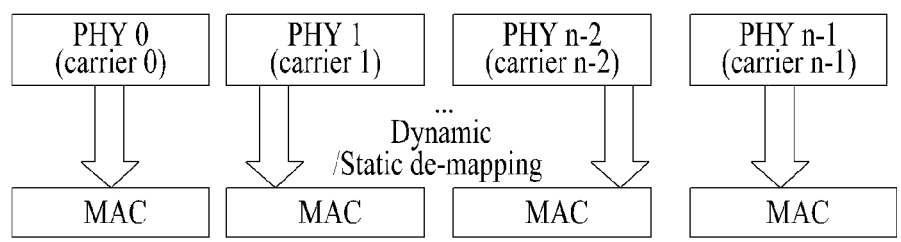
FIG. 7(b) illustrates multiple carriers of a terminal.
Figure 8A:
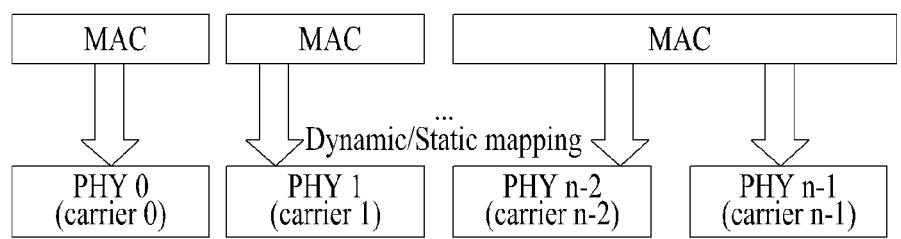
FIG. 8(a) illustrates multiple carriers of a base station.
Figure 8B:
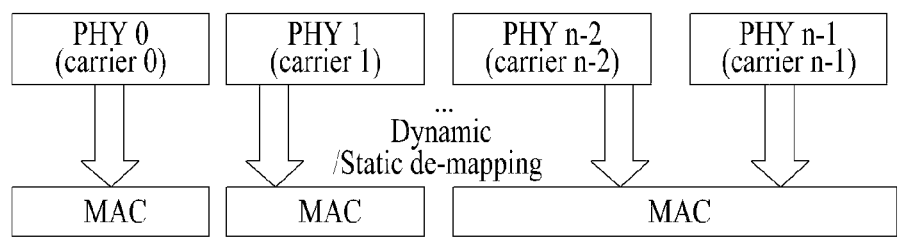
FIG. 8(b) illustrates multiple carriers of a terminal.

The multiple MACs may one-to-one control multiple carriers, as shown in FIGS. 7(a) and 7(b), and MACs may one-to-one control some carriers and one MAC may control the remaining carriers, as shown in FIGS. 8(a) and 8(b).

The above-described system is a system including 1 to N carriers and the carriers can be used contiguously or non-contiguously. This can be applied to both uplink and downlink. In a TDD system, N carriers are operated while each carrier is used for DL and UL transmission. In the case of an FDD system, multiple carriers can be used for each of uplink and downlink. In LTE Rel-8, transmission/reception in a single carrier is supported while uplink and downlink may have different bandwidths. In LTE-A, however, multiple carriers can be operated through carrier aggregation, as described above. In addition, the FDD system can also support asymmetric carrier aggregation in which uplink and downlink have different numbers of aggregated carriers and/ or different carrier bandwidths.

The present invention is applicable to a variety of multi-node systems. For example, embodiments of the present invention can be applied to a distributed antenna system (DAS), a macro-node having low-power RRHs, multi-BS cooperation system, a pico-femto-cell cooperation system and combinations thereof.

The DAS uses a BS or a BS controller that manages a plurality of antennas located at predetermined intervals in an arbitrary geographical area (which may be called a cell) and a plurality of distributed antennas connected through cables or dedicated lines for communication. In the DAS, each antenna or each antenna group may be a node of a multi-node system according to the present invention and each antenna may operate as a subset of antennas included in the BS or BS controller. That is, the DAS is a kind of multi-node system and a distributed antenna or antenna group is a kind of node in a multi-antenna system. The DAS is distinguished from a centralized antenna system (CAS) in which multiple antennas are concentrated at the center of a cell since multiple antennas included in the DAS are located at predetermined intervals in a cell. Furthermore, the DAS is distinguished from a femto-/pico-cell cooperation system in that the DAS is managed by distributed antennas or distributed antenna groups and all antennas located in a cell are managed by a BS or a BS controller at the center of the cell. In addition, the DAS differs from a relay system or ad-hoc network using a BS wirelessly connected to a relay station (RS) because distributed antennas included in the DAS are connected through cables or dedicated lines. Moreover, the DAS is discriminated from a repeater that simply amplifies and transmits signals since the distributed antennas or distributed antenna groups can transmit signals different from signals of other distributed antennas or distributed antenna groups to a nearby UE.

In a multi-node system (DAS), one or more BSs connected to multiple nodes can cooperate to simultaneously transmit signals to a UE or simultaneously receive a signal from the UE.

If transmission and reception of all nodes in a system are managed by one controller and thus individual nodes operate as if they are some antenna groups of a BS, this system can be regarded as a distributed multi-node system (DMNS). In this case, individual nodes may be assigned separate node IDs or may operate as some antennas in a cell without separate node IDs.

If nodes have different cell IDs in a DMNS, this system can be regarded as a multi-cell (e.g. macro-cell/femto-cell/pico-cell) system. When multiple cells respectively formed by multiple nodes are configured in an overlay manner according to coverage, this is called a multi-tier network.

Various types of BSs can be used as nodes irrespective of the names thereof. That is, BS (base station), NB (node-B), eNB (eNode-B), pico-cell eNB (PeNB), home eNB (HeNB), RRH (remote radio head), RRU (remote radio unit), relay, repeater, etc. can be nodes. Here, detailed operations of the RRH will be described later with reference to FIG. 9. At least one antenna is installed per node. An antenna may be a physical antenna or may refer to an antenna port, a virtual antenna or an antenna group. A node may also be called a point.

While a node represents each of antenna groups spaced at predetermined intervals in general, the node may refer to an arbitrary antenna group irrespective of antenna group spacing. Furthermore, a BS refers to an arbitrary node on a network, which communicates with a UE, such as Node B, eNode B, AP (access point), etc. For example, it can be assumed that the BS controls a node composed of an H-pol antenna and a node composed of a V-pol antenna.

Figure 9:
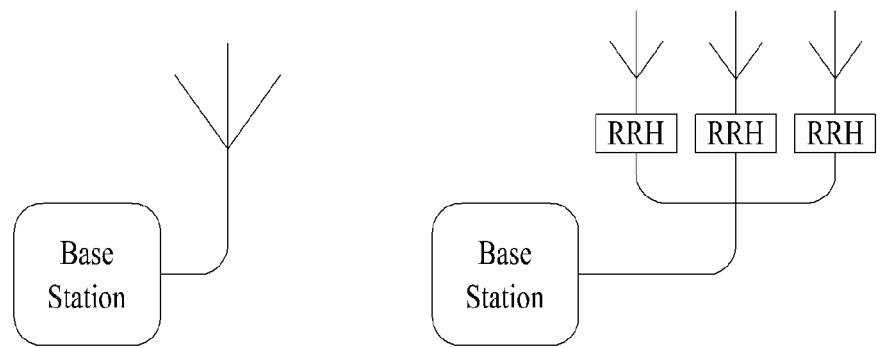
FIG. 9 illustrates an exemplary base station and RRH structure.

FIG. 9 illustrates a BS and an RRH.

FIG. 9(a) shows a conventional BS and FIG. 9(b) shows an RRH configuration in which a radio frequency (RF) transceiver and a power amplifier are separated from a BS and located near antennas such that antennas operate as BSs. According to this configuration, radio capacity can be increased and finance for installation of BS can be minimized by reducing the distance between a UE and a BS antenna. An RRH is independent of a BS and a radio part of the BS can be separated and function as a relay for transmitting/receiving audio and data.

For example, if a macro cell includes a plurality of nodes (or points), functions of the nodes are identical to the function of the above-described RRH while the nodes may be called a coordinated RRH set, a measurement RRH set, a transmission point set, a reception point set, etc.

In an environment to which the RRH is introduced, since a UE may transmit an uplink signal to a node (or RRH) other than a BS, a downlink pathloss component for the node needs to be calculated in order to determine Tx power for uplink signal transmission to the node other than the BS.

However, it is difficult for the UE to discriminate signals of the BS and the plurality of nodes (e.g. RRHs) because the BS and the nodes transmit a common cell-specific reference signal (CRS), and thus correct pathloss may not be estimated.

Nodes of a multi-BS cooperation system or femto-/pico-cell cooperation system operate as independent BSs and cooperate. Accordingly, each BS of the multi-BS cooperation system or femto-/pico-cell cooperation system may be a node in the multi-node system of the present invention. Multiple nodes of the multi-BS cooperation system or femto-/pico-cell cooperation system are connected through a backbone network and perform coordinated transmission/reception by carrying out scheduling and/or handover together. A system in which a plurality of BSs participates in coordinated transmission is called a coordinated multi-point (CoMP) system.

There is a difference among various multi-node systems such as DAS, macro-node having low-power RRHs, multi-BS cooperation system, femto-/pico-cell cooperation system, etc. However, the multi-node systems differ from a single node system (e.g. CAS, conventional MIMO system, conventional relay system, conventional repeater system, etc.) and embodiments of the present invention are applicable thereto since multiple nodes cooperate to participate in providing communication services to UEs. In the following, the present invention will be described focusing on the DAS for convenience. However, the following description is exemplary and the present invention is equally applicable to other multi-node systems since an antenna or antenna group of the DAS can correspond to a node of other multi-node systems and a BS of the DAS can correspond to one or more coordinated BSs of other multi-node systems.

However, uplink/downlink communication between macro cells or between nodes/points in a macro cell is supported, a power control method that does not consider the macro cells or nodes/points in a macro cell has a limitation in improving interference control and system performance.

Therefore, the present invention proposes an uplink/downlink power control method for a UE in consideration of a system supporting uplink/downlink communication between macro cells or between cooperation nodes in a macro cell.

When a UE transmits/receives signals to/from BSs, nodes or antennas geographically spaced apart therefrom, there is benefit in improving transmission/reception performance when the power control method according to the present invention is applied. If the benefit is reflected in Tx power of the UE or BSs, the UE can maintain the performance and thus interference is reduced, achieving system performance improvement. In addition, battery life can be increased.

Figure 10:
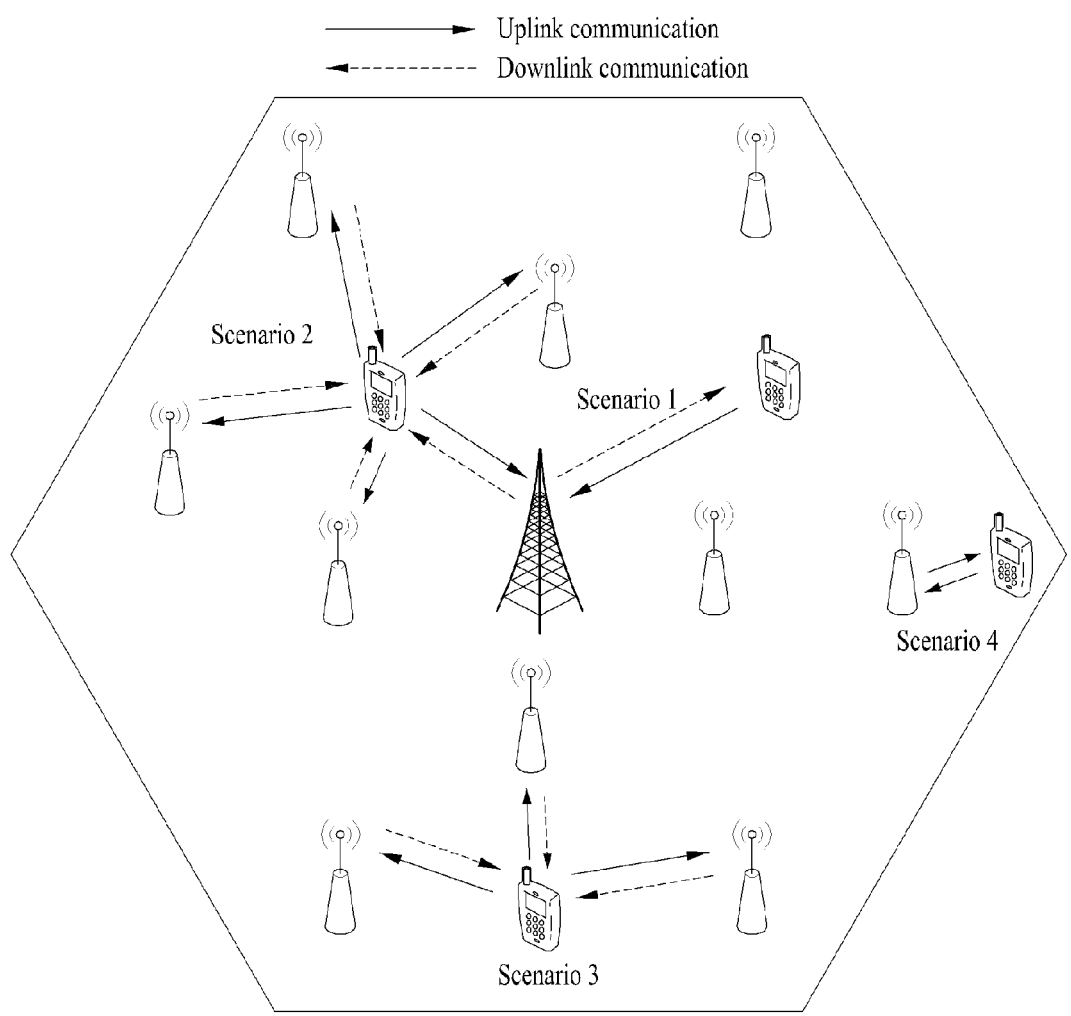
FIG. 10 illustrates an exemplary multi-node communication environment to which the present invention is applied.

FIG. 10 illustrates communication methods according to various scenarios in a multi-node communication environment to which the present invention is applied.

Referring to FIG. 10, scenario 1 corresponds to a case in which a UE communicates with a macro BS only in a macro cell. In scenario 1, Tx power necessary for the UE to transmit an uplink signal to the macro BS can be regarded as P1[dBm]. Scenario 2 corresponds to a case in which a UE communicates with the macro BS and four cooperation nodes controlled by the macro BS. Scenario 3 corresponds to a case in which a UE communicates with three cooperation nodes controlled by the macro BS instead of the macro BS. Scenario 4 corresponds to a case in which a UE communicates with one node controlled by the macro BS. Scenarios other than the above-described ones are available and they can be varied according to selection of a UE, macro BS and cooperation nodes controlled by the macro BS or time. A BS or cooperation nodes related to uplink may be identical to or different from a BS or cooperation nodes related to uplink communication.

A description will be given of uplink Tx power in the communication environment of scenario 3 in which a UE communicates with three cooperation nodes controlled by the macro BS in one cell according to the present invention.

The macro BS can control the three cooperation nodes other than macro BSs. Multiple nodes of a cooperation system can be connected through a wired or wireless backbone network. In this case, the three cooperation nodes may correspond to antennas connected in a wired manner in a DAS environment. That is, the three cooperation nodes are located close to the UE and can transmit signals with power lower than Tx power of one BS even when the UE transmits a signal with low power. Furthermore, the UE transmits an uplink signal with low power and thus data throughput of the uplink signal can be maintained identical to data throughput when the UE communicates with one macro BS. Moreover, since an uplink signal is transmitted with low power, the influence of interference generated from other BSs or nodes can be reduced. That is, uplink signal power can be reduced using diversity gain information while obtaining the same gain. Transmission and reception using low power are achieved because it is easy to perform communication between the UE and cooperation nodes or RRHs in the macro cell, which are located a short distance from the UE. In this case, the UE can receive diversity gain information from the BS.

In scenario 3, a transmission/reception diversity gain of the UE when the UE communicates with the three cooperation nodes is different from a transmission/reception diversity gain when the UE communicates with the macro BS.

If Tx power necessary for the UE to communicate with the macro BS is P1[dBm], Tx power necessary for the UE to communicate with the three cooperation nodes is P3[dBm]=P1−offset[dB]. Here, the offset can be a positive number. That is, P3 is smaller than P1. Tx power necessary for communication with a plurality of BSs can be reduced by applying different offset values to diversity gain, as compared to a single load.

Tx powers of uplink signals such as a PUSCH, power headroom, PUCCH, sounding reference symbol (SRS) and random access channel (RACH) are represented by Equations 3, 4, 5, 6, 7 and 8.

Equation 3 represents Tx power of the PUSCH and is applicable when the PUSCH and PUCCH are not simultaneously transmitted in a component carrier/cell.

$$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} [dBm]$$

[Equation 3]

In Equation 3, $P_{CMAX,c}$ represents maximum Tx power of a UE of the specific cell c and $M_{PUSCH,c}$ is a parameter indicating a PUSCH resource allocation bandwidth represented as the number of effective resource blocks of the specific cell c for subframe i and is allocated by a BS. In addition, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific nominal component $P_{O\_UE\_PUSCH,c}(j)$ provided by the higher layer and is signaled by the BS to the UE. Furthermore, $\alpha_c(j)$ is a cell-specific parameter provided by the higher layer of the specific cell c and transmitted as 3 bits by the BS. $\alpha \in \{0, 0.4, 0.5, 0.6, 0.7, 0.8, 0.9, 1\}$ when j=0 or 1 and $\alpha(j)=1$ when j=2. $\alpha_c(j)$ is signaled by the BS to the UE. In addition, pathloss $PL_c$ is a downlink pathloss (or signal loss) estimate calculated in dB by the UE of the specific cell c and is represented as $PL_c$=referenceSignalPower higher layer filteredRSRP where referenceSignalPower can be signaled by the BS to the UE through a higher layer. In Equation 3, $f_c(i)$ indicates a current PUSCH power control adjustment state for the subframe i of the specific cell c and can be represented as a current absolute value or accumulated value.

$\Delta_{TF,c}(i)$ defined in 3GPP LTE/LTE-A is set to a value for one codeword of the specific cell c. For a specific codeword index, $\Delta_{TF}(i)=10 \log_{10}((2^{MPR \cdot K_S}-1)\beta_{offset}^{PUSCH})$ if $K_S$=1.25 and $\Delta_{TF}(i)=0$ if $K_S=0$. Here, $K_S$ may be a UE-specific parameter 'deltaMCS-Enabled' provided by the BS to the UE per codeword through a higher layer. If $K_S$=0, $\Delta_{TF}(i)=0$ and Tx power becomes uniform for codewords. If $K_S$=1.25, however, Tx power may be different for respective codewords according to transmission information size (or scheduled MCS level) normalized with allocated resources of each codeword. Here, parameter MPR may also be called bits per resource element (BPRE). That is, when $K_S$ is not 0, $\Delta_{TF}(i)$ can be generated based on the quantity of information (e.g. BPRE) per unit resource for each codeword.

Equation 4 is applicable when the PUCCH and PUSCH are simultaneously transmitted.

That is, power control for the PUSCH can be performed when the PUCCH and PUSCH are simultaneously transmitted in consideration of a difference between the linear value of the maximum Tx power $P_{CMAX}$ of the UE of the specific cell c and the linear value of PUCCH power of the specific cell c.

$$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} [dBm]$$

[Equation 4]

In Equation 4, $\hat{P}_{CMAX,c}(i)$ is the linear value of maximum Tx power of the UE of the specific cell c and $\hat{P}_{PUCCH}(i)$ is the linear value of Tx power $P_{PUCCH}(i)$ of the PUCCH.

Equation 5 represents power headroom for reporting of type 1 of power headroom when the UE transmits the PUSCH without the PUCCH in the subframe i for the serving cell c.

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]$$

[Equation 5]

In Equation 5, $P_{CMAX,c}$ indicates maximum Tx power of the UE of the specific cell c and $M_{PUSCH,c}$ is a parameter indicating a PUSCH resource allocation bandwidth represented as the number of effective resource blocks for the subframe i of the specific cell c and is allocated by the BS. In addition, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific nominal component $P_{O\_UE\_PUSCH,c}(j)$ provided from the higher layer and is signaled by the BS to the UE. Furthermore, $\alpha_c(j)$ is a cell-specific parameter provided by the higher layer of the specific cell c and transmitted as 3 bits by the BS, $\alpha \in \{0, 0.4, 0.5, 0.6, 0.7, 0.8, 0.9, 1\}$ when j=0 or 1 and $\alpha_c(j)=1$ when j=2. $\alpha_c(j)$ is signaled by the BS to the UE. In addition, PL, is a downlink pathloss (or signal loss) estimate calculated in dB by the UE of the specific cell c and is represented as $PL_c$=referenceSignalPower−higher layer filteredRSRP. In Equation 5, $f_c(i)$ indicates a current PUSCH power control adjustment state and can be represented as a current absolute value or accumulated value.

The power headroom $PH_c$ is composed of 64 level values between −23 dB to 40 dB and delivered from the physical layer to a higher layer. A PH MAC control element is identified by MAC PDU subheader. Equation 5 can be extended to PHR definition (simultaneous PUCCH and PUSCH transmission and virtual PHR definition (in this case, 0 or a set value can be used)) in various cases.

Equation 6 represents Tx power of the PUCCH and specifies a case in which the UE transmits the PUCCH in the subframe i for the serving cell c in Equation 1.

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}$$ [Equation 6]

In Equation 6, i indicates a subframe index, $P_{CMAX,c}$ represents maximum Tx power of the UE of the specific cell c, and $P_{O\_PUSCH,c}$ is a parameter corresponding to the sum of cell-specific parameters and is signaled by the BS through higher layer signaling. PL is downlink pathloss (or signal loss) estimate calculated in dB by the UE and is represented as PL=referenceSignalPower−higher layer filteredRSRP. In addition, $h(n_{CQI}, n_{HARQ}, n_{SR})$ is a value depending on PUCCH format where $n_{CQI}$ is the number of information bits of CQI in a specific subframe, $n_{HARQ}$ is the number of HARQ bits in the specific subframe and $n_{SR}$ is 1 when the specific subframe is composed of SR for a UE having no transport block with respect to UL-SCH and 0 in other cases.

$\Delta_{F\_PUCCH}(F)$ is a relative value for PUCCH format 1, corresponds to PUCCH format (F) and is signaled by the BS through higher layer signaling and g(i) indicates the current PUCCH power control adjustment state of the subframe i. Here, $n_{CQI}$ is the number of information bits of CQI in a specific subframe, $n_{HARQ}$ is the number of HARQ bits in the specific subframe and $n_{SR}$ is 1 when the specific subframe is composed of SR for a UE having no transport block with respect to UL-SCH and 0 in other cases. $\Delta_{TxD}(F')$ is a value determined by a higher layer in which PUCCH format F' is defined when the PUCCH is configured by the UE such that the PUCCH is transmitted through two antenna ports.

Equation 7 shows Tx power of a sounding reference symbol (SRS), which corresponds to Tx power for the SRS transmitted by the UE in the subframe i for the serving cell c.

$P_{SRS,c}(i) = \min\{P_{CMAX,c}(i), P_{SRS\_OFFSET,c}(m)+10\log_{10}(M_{SRS,c})+P_{O\_PUSCH,c}(j)+\alpha_c(j)\cdot PL_c+f_c(i)\}$ [dBm] [Equation 7]

In Equation 7, i indicates a subframe index and $P_{SRS,c}(i)$ represents SRS power transmitted in the subframe i of the specific cell c. $P_{SRS\_OFFSET,c}(m)$, $M_{SRS,c}$ and $P_{O\_PUSCH,c}(j)$, $\alpha_c(j)$ are signaled by the BS to the UE through a higher layer signal and $f_c(i)$ is dynamically signaled by the BS of the specific cell c to the UE through a TPC command of a PDCCH. $P_{SRS\_OFFSET,c}(m)$ is a UE-specific parameter (e.g. 4 bits) corresponding to a power offset value for SRS transmission of the specific cell c, is semi-statically configured by a higher layer and is signaled by the BS to the UE. $M_{SRS,c}$ is an SRS transmission bandwidth represented as the number of resource blocks and $f_c(i)$ indicates current PUSCH power control adjustment state and can be represented as a current absolute value or accumulated value. In addition, $\alpha_c(j)$ is a cell-specific parameter transmitted as 3 bits by the BS in a higher layer of the specific cell index c, and $\alpha_c \in \{0, 0.4, 0.5, 0.6, 0.7, 0.8, 0.9, 1\}$ when j=0 or 1 and $\alpha_c 0=1$ when j=2. The BS can signal $\alpha_c(j)$ to the UE.

$P_{CMAX,c}(i)$ indicates maximum Tx power of the UE of the specific cell c and $M_{SRS,c}$ indicates the SRS transmission bandwidth in the subframe i and is represented as the number of resource blocks of the specific cell c. $P_{O\_PUSCH,c}(j)$ is a parameter corresponding to the sum of a cell-specific nominal component $P_{O\_NOMINAL\_PUSCH,c}(i)$ provided by a higher layer of the specific cell c and a UE-specific component $P_{O\_UE\_PUSCH,c}(i)$ provided by the higher layer of the specific cell c and is signaled by the BS to the UE.

$PL_c$ is a downlink pathloss (or signal loss) estimate calculated in dB by the UE of the specific cell c and is represented as $PL_c$=referenceSignalPower−higher layer filteredRSRP. The BS can signal $P_{SRS\_OFFSET,c}(M)$ to the UE by discriminating periodic SRS transmission from aperiodic SRS transmission. For example, in the case of trigger type 0 corresponding to m=0, the BS can signal a power offset value for periodic SRS transmission to the UE through higher layer signaling. In the case of trigger type 1 corresponding to m=1, the BS can signal a power offset value for aperiodic SRS transmission to the UE through higher layer signaling.

Equation 8 represents Tx power of a random access channel (RACH).

A random access procedure of a UE includes the following four steps. In the first step, the UE selects an arbitrary random access preamble based on system information in order to request RACH allocation and transmits the selected random access preamble to the BS. The random access preamble corresponds to RACH message 1. The random access preamble conforms to a RACH preamble format defined in the corresponding cell. In addition, the random access preamble is transmitted using a PRACH resource allocated in the cell.

In the second step, the BS receives RACH message 1 corresponding to the random access preamble from the UE and transmits a random access response message to the UE in response to the received RACH message 1. The random access response message corresponds to RACH message 2. Here, RACH message 2 includes preamble ID indicating the received RACH message 1, timing advance (TA) information for correcting uplink timing, uplink resource allocation information for uplink message transmission, temporary UE ID (temporary RNTI), etc.

In the third step, the UE transmits an uplink message to the BS using an allocated resource included in RACH message 2 received from the BS. The uplink message corresponds to RACH message 3. The uplink message includes unique ID (S-TMSI) of the UE or an arbitrary number. The uplink message refers to data as well as an uplink control message.

In the fourth step, the BS transmits a contention resolution message to the UE in response to RACH message 3. The contention resolution message corresponds to RACH message 4. Here, RACH message 4 includes the unique ID (S-TMSI) of the UE, received from the UE, or an arbitrary number. RACH message 4 is transmitted in response to RACH message 3 in order to prevent contention.

For example, even if contention occurs since a plurality of UEs transmit RACH message 1 at the same time, the UEs can check whether or not RACH access has been successfully performed using IDs thereof or arbitrary numbers included in RACH message 4 transmitted from the BS. That is, each of the UE checks whether the ID thereof or arbitrary number included in RACH message 4 corresponds to the value included in RACH message 3 and transmitted by the UE. RACH access is considered successful if the IDs correspond to each other, whereas RACH access is considered to have failed if the IDs are different from each other. A UE that has not successfully performed RACH access re-executes RACH access.

While the above-described RACH access procedure is applicable to a low-power UE, the RACH access procedure may not be successfully performed according to network environment because a RACH preamble format defined in a cell is set for RACH access of high-power UEs.

Equation 8 represents preamble Tx power of the UE when RACH message 3 corresponding to the uplink message for the random access response message is transmitted in the third step of the random access procedure.

$$P_{PRACH} = \min\{P_{CMAX,c}(i), \text{PREAMBLE\_RECEIVED\_TARGET\_POWER} + PL_c\}\_[dBm] \quad \text{[Equation 8]}$$

In Equation 8, $P_{CMAX,C}$ indicates maximum Tx power of the UE for the serving cell c and PREAMBLE_RECEIVED_TARGET_POWER represents Rx power of a RACH preamble targeted by the BS using basic PRACH resource allocation information. $PL_c$ is a downlink pathloss (or signal loss) estimate calculated in dB by the UE of the specific cell c and is represented as PL=referenceSignalPower−higher layer filteredRSRP.

The present invention can apply the diversity gain to uplink signal power control. That is, an offset value $\text{offset}_{BS\_Diversity\_margin}$ according to diversity gain can be additionally considered for Tx power of uplink signals such as PUSCH, power headroom, PUCCH, SRS and RACH in Equations 3 to 8.

The uplink signal Tx power can be determined by the processor of the UE 110 shown in FIG. 1. The offset value $\text{offset}_{BS\_Diversity\_margin}$ according to diversity gain in uplink signal Tx power can be signaled through the receiver 140 shown in FIG. 1.

PUSCH Tx power is controlled in consideration of $\text{offset}_{BS\_Diversity\_margin}$ corresponding to transmission/reception diversity gain of the UE with respect to cooperation nodes, applied by the present invention.

Equation 9 represents PUSCH Tx power obtained when the transmission/reception diversity gain of the UE with respect to cooperation nodes is applied to Equation 3.

$$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin} \end{cases} [dB] \quad \text{[Equation 9]}$$

Equation 10 represents PUSCH Tx power obtained when the transmission/reception diversity gain of the UE with respect to cooperation nodes is applied to Equation 4

$$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin} \end{cases} [dB] \quad \text{[Equation 10]}$$

Equation 11 represents power headroom obtained when the transmission/reception diversity gain of the UE with respect to cooperation nodes is applied to Equation 5.

$$PH_{type1,c}(i) = P_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin}\}[dB] \quad \text{[Equation 11]}$$

Equation 12 represents PUCCH Tx power obtained when the transmission/reception diversity gain of the UE with respect to cooperation nodes is applied to Equation 6.

$$P_{PUCCH}(i) = \min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) - \text{offset}_{BS\_Diversity\_margin} \end{cases} \quad \text{[Equation 12]}$$

Equation 13 represents SRS Tx power obtained when the transmission/reception diversity gain of the UE with respect to cooperation nodes is applied to Equation 7.

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i) - \text{offset}_{BS\_Diversity\_margin}\} \quad \text{[Equation 13]}$$

Equation 14 represents RACH Tx power obtained when the transmission/reception diversity gain of the UE with respect to cooperation nodes is applied to Equation 8.

$$P_{PRACH} = \min\{P_{CMAX,c}(i), \text{PREAMBLE\_RECEIVED\_TARGET\_POWER} + PL_c - \text{offset}_{BS\_Diversity\_margin}\}[\text{dBm}] \quad \text{[Equation 14]}$$

While transmission/reception gain is definite when the location relation between the UE and neighboring BSs is ideal, as shown in FIG. 10, the offset value can be determined within a predetermined range and signaled as multiple levels to the UE through L1 and/or higher layer signaling since a BS installation environment and UE communication environment may vary with time. If link characteristics of the three BSs communicated with the UE are identical or similar in the above-described example, the offset value can be set in consideration of expected gain without increasing complexity of the power setting step. However, if the UE communicates with BSs having different link characteristics, much more components need to be reflected in the power setting step in order to satisfy reception performance with respect to each BS. For example, when BSs have different pathlosses, noises and interference levels, Tx power of the UE is determined based on a BS having poor link characteristic and thus a BS having relatively good link characteristics receives excessive power. Even in this case, however, the offset value is applicable since multi-point transmission gain is generated. Accordingly, the BS signals, to the UE, the offset value with respect to diversity gain according to transmission/reception point configuration in the current position of the UE.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Industrial Applicability

A BS apparatus and method for controlling Tx power are applicable to various communication systems such as 3GPP LTE, LTE-A, IEEE 802, etc.

The invention claimed is:

1. A method for controlling uplink transmit (Tx) power of a terminal communicating with a plurality of cooperation nodes controlled by one base station in one cell in a wireless communication system, the method comprising:
   receiving diversity gain information of the plurality of cooperation nodes;
   determining uplink Tx power of an uplink signal in consideration of the diversity gain information; and
   transmitting the uplink signal with the determined uplink Tx power,
   wherein the diversity gain information is an offset value,
   wherein the offset value is set considering a diversity margin of the plurality of cooperation nodes when the plurality of cooperation nodes and the terminal have identical link characteristics, and
   wherein the offset value is set considering a diversity margin of a node having a comparatively poor link among the plurality of cooperation nodes when the plurality of cooperation nodes and the terminal have different link characteristics.

2. The method according to claim 1, wherein the diversity gain information of the plurality of cooperation nodes is signaled from the plurality of cooperation nodes.

3. The method according to claim 1, wherein the plurality of cooperation nodes are remote radio heads (RRHs) or wired antennas of a distributed antenna system (DAS).

4. The method according to claim 1, wherein, when the uplink signal is a physical uplink shared channel (PUSCH), the determined uplink Tx power corresponds to the following equation A $$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin} \end{cases} \quad \text{[Equation A]}$$

wherein c indicates the index of the specific cell, i represents a subframe index, $P_{PUSCH,c}(i)$ is PUSCH Tx power in the subframe i of the specific cell c, $P_{CMAX,c}(i)$ is maximum Tx power of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF,c}(i)$ is a value for one codeword of the specific cell c, and $\text{offset}_{BS\_Diversity\_margin}$ is the offset value.

5. The method according to claim 1, wherein, when the uplink signal is a PUSCH and the PUSCH and a PUCCH are simultaneously transmitted, the determined uplink Tx power corresponds to the following equation B $$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin} \end{cases}$$ [Equation B]

wherein c indicates the index of the specific cell, i represents a subframe index, $P_{PUSCH,c}(i)$ is PUSCH Tx power in the subframe i of the specific cell c, $\hat{P}_{PUCCH,c}(i)$ is the linear value of PUCCH Tx power, $\hat{P}_{CMAX,c}(i)$ is the linear value of maximum Tx power $P_{CMAX,c}(i)$ of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF_c}(i)$ is a value for one codeword of the specific cell c, and $\text{offset}_{BS\_Diversity\_margin}$ is the offset value.

6. The method according to claim 1, wherein a power headroom corresponding to Tx power usable as the uplink signal conforms to the following equation C $$PH_{Type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin}\}$$ [Equation C]

wherein c indicates the index of the specific cell, i represents a subframe index, $PH_{Type1,c}(i)$ is power headroom power in the subframe i of the specific cell c, $P_{CMAX,c}(i)$ is maximum Tx power of the terminal, $M_{PUSCH,c}(i)$ is a parameter indicating a PUSCH resource allocation bandwidth represented by the number of effective resource blocks for the subframe i of the specific cell c, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF_c}(i)$ is a value for one codeword of the specific cell c, and $\text{offset}_{BS\_Diversity\_margin}$ is the offset value.

7. The method according to claim 1, wherein, when the uplink signal is a physical uplink control channel (PUCCH), the determined uplink Tx power corresponds to the following equation D $$P_{PUCCH}(i) = \min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) - \text{offset}_{BS\_Diversity\_margin} \end{cases}$$ [Equation D]

wherein c indicates the index of the specific cell, i represents a subframe index, $P_{PUCCH}(i)$ is PUCCH Tx power in the subframe i of the specific cell c, $P_{CMAX,c}(i)$ is maximum Tx power of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $h(n_{CQI}, n_{HARQ}, n_{SR})$ is a value varied according to PUCCH format, $n_{CQI}$ represents the number of information bits of channel quality information (CQI), $n_{HARQ}$ represents the number of HARQ bits, $n_{SR}$ is a value indicating whether a specific subframe has a PUSCH transport block, $\Delta_{F\_PUCCH}(F)$ is a relative value for PUCCH format 1a, g(i) is a value indicating a current PUCCH power control adjustment state of the subframe i, $\Delta_{TxD}(F')$ is a value determined by a higher layer in which PUCCH format F' is defined when the PUCCH is configured by the terminal such that the PUCCH is transmitted through two antenna ports, and $\text{offset}_{BS\_Diversity\_margin}$ is the offset value.

8. The method according to claim 1, wherein, when the uplink signal is a sounding reference symbol (SRS), the determined uplink Tx power corresponds to the following equation E $$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i) - \text{offset}_{BS\_Diversity\_margin}\}$$ [Equation E]

wherein c indicates the index of the specific cell, i represents a subframe index, $P_{SRS,c}(i)$ is SRS Tx power in the subframe i of the specific cell c, $P_{CMAX,c}(i)$ is maximum Tx power of the terminal, $P_{SRS\_OFFSET,c}(m)$ is a UE-specific parameter corresponding to a power offset value for SRS transmission of the specific cell c, $M_{SRS,c}$ is SRS transmission bandwidth represented by the number of resource blocks, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, and $\text{offset}_{BS\_Diversity\_margin}$ is the offset value.

9. The method according to claim 1, wherein, when the uplink signal is a random access channel (RACH), the determined uplink Tx power corresponds to the following equation F $$P_{PRACH} = \min\{P_{CMAX,c}(i), \text{PREAMBLE\_RECEIVED\_TARGET\_POWER} + PL_c - \text{offset}_{BS\_Diversity\_margin}\}$$ [Equation F]

wherein c indicates the index of the specific cell, i represents a subframe index, $P_{PRACH}$ is RACH Tx power in the subframe i of the specific cell c, PREAMBLE_RECEIVED_TARGET_POWER represents receive (Rx) power of a RACH preamble targeted by a BS, $PL_c$ is a downlink pathloss estimate calculated in dB by the terminal of the specific cell c, and $\text{offset}_{BS\_Diversity\_margin}$ is the offset value.

10. A terminal communicating with a plurality of cooperation nodes controlled by one base station in one cell, for controlling uplink Transmit (Tx) power in a wireless communication system, the terminal comprising:

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin} \end{cases}$$ [Equation B]

a transceiver configured to transmit and receive a signal; and
a processor configured to control the transceiver,
wherein the processor is further configured to:
 control the transceiver to receive diversity gain information of the plurality of cooperation nodes,
 determine uplink Tx power of an uplink signal in consideration of the diversity gain information, and
 control the transceiver to transmit the uplink signal with the determined uplink Tx power,
wherein the diversity gain information is an offset value,
wherein the offset value is set considering a diversity margin of the plurality of cooperation nodes when the plurality of cooperation nodes and the terminal have identical link characteristics, and
wherein the offset value is set considering a diversity margin of a node having a comparatively poor link among the plurality of cooperation nodes when the plurality of cooperation nodes and the terminal have different link characteristics.

11. The terminal according to claim 10, wherein the diversity gain information of the plurality of cooperation nodes is signaled from the plurality of cooperation nodes.

12. The terminal according to claim 10, wherein the plurality of cooperation nodes are RRHs or wired antennas of a DAS.

13. The terminal according to claim 10, wherein, when the uplink signal is a PUSCH, the determined uplink Tx power corresponds to the following equation A $$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin} \end{cases}$$ [Equation A]

wherein c indicates the index of the specific cell, i represents a subframe index, $P_{PUSCH,c}(i)$ is PUSCH Tx power in the subframe i of the specific cell c, $P_{CMAX,c}(i)$ is maximum Tx power of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF,c}(i)$ is a value for one codeword of the specific cell c, and $\text{offset}_{BS\_Diversity\_margin}$ is the offset value.

14. The terminal according to claim 10, wherein, when the uplink signal is a PUSCH and the PUSCH and a PUCCH are simultaneously transmitted, the determined uplink Tx power corresponds to the following equation B wherein c indicates the index of the specific cell, i represents a subframe index, $P_{PUSCH,c}(i)$ is PUSCH Tx power in the subframe i of the specific cell c, $\hat{P}_{PUCCH,c}(i)$ is the linear value of PUCCH Tx power, $\hat{P}_{CMAX,c}(i)$ is the linear value of maximum Tx power $P_{CMAX,c}(i)$ of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF,c}(i)$ is a value for one codeword of the specific cell c, and $\text{offset}_{BS\_Diversity\_margin}$ is the offset value.

15. The terminal according to claim 10, wherein a power headroom corresponding to Tx power usable as the uplink signal conforms to the following equation C $$PH_{type1,c}(i) = P_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i) - \text{offset}_{BS\_Diversity\_margin}\}$$ [Equation C]

wherein c indicates the index of the specific cell, i represents a subframe index, $PH_{Type1,c}(i)$ is power headroom power in the subframe i of the specific cell c, $P_{CMAX,c}(i)$ is maximum Tx power of the terminal, $M_{PUSCH,c}(i)$ is a parameter indicating a PUSCH resource allocation bandwidth represented by the number of effective resource blocks for the subframe i of the specific cell c, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, $\Delta_{TF,c}(i)$ is a value for one codeword of the specific cell c, and $\text{offset}_{BS\_Diversity\_margin}$ is the offset value.

16. The terminal according to claim 10, wherein, when the uplink signal is a PUCCH, the determined uplink Tx power corresponds to the following equation D $$P_{PUCCH}(i) = \min\left\{\begin{array}{l}P_{CMAX,c}(i),\\ P_{0\_PUCCH} + PL_c + h(n_{CQI}, n_{HARQ}, n_{SR}) + \Delta_{F\_PUCCH}(F) + \Delta_{TxD}(F') + g(i) - \textit{offset}_{BS\_Diversity\_margin}\end{array}\right\}$$ [Equation D]

wherein c indicates the index of the specific cell, i represents a subframe index, $P_{PUCCH}(i)$ is PUCCH Tx power in the subframe i of the specific cell c, $P_{CMAX,c}(i)$ is maximum Tx power of the terminal, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $h(n_{CQI}, n_{HARQ}, n_{SR})$ is a value varied according to PUCCH format, $n_{CQI}$ represents the number of information bits of channel quality information (CQI), $n_{HARQ}$ represents the number of HARQ bits, $n_{SR}$ is a value indicating whether a specific subframe has a PUSCH transport block, $\Delta_{F\_PUCCH}(F)$ is a relative value for PUCCH format 1a, g(i) is a value indicating a current PUCCH power control adjustment state of the subframe i, $\Delta_{TxD}(F')$ is a value determined by a higher layer in which PUCCH format F' is defined when the PUCCH is configured by the terminal such that the PUCCH is transmitted through two antenna ports, and $\textit{offset}_{BS\_Diversity\_margin}$ is the offset value.

17. The terminal according to claim 10, wherein, when the uplink signal is a SRS, the determined uplink Tx power corresponds to the following equation E $$P_{SRS,c}(i) = \min\{P_{CMAX,c}(i), P_{SRS\_OFFSET,c}(m) + 10\log_{10}(M_{SRS,c}) + P_{O\_PUSCH,c}(j)\alpha_c(j)\cdot PL_c + f_c(i) - \textit{offset}_{BS\_Diversity\_margin}\}$$ [Equation E]

wherein c indicates the index of the specific cell, i represents a subframe index, $P_{SRS,c}(i)$ is SRS Tx power in the subframe i of the specific cell c, $P_{CMAX,c}(i)$ is maximum Tx power of the terminal, $P_{SRS\_OFFSET,c}(m)$ is a UE-specific parameter corresponding to a power offset value for SRS transmission of the specific cell c, $M_{SRS,c}$ is SRS transmission bandwidth represented by the number of resource blocks, $P_{O\_PUSCH,c}(j)$ is a parameter corresponding to the sum of a cell-specific nominal component $P_{O\_NOMINAL\_PUSCH,c}(j)$ provided by a higher layer of the specific cell c and a UE-specific component $P_{O\_UE\_PUSCH,c}(j)$ provided by the higher layer, $\alpha_c(j)$ is a cell-specific parameter, $PL_c$ is a downlink pathloss estimate calculated in dB by the terminal of the specific cell c, $f_c(i)$ is a value indicating a current PUSCH power control adjustment state for the subframe i of the specific cell c, and $\textit{offset}_{BS\_Diversity\_margin}$ is the offset value.

18. The terminal according to claim 10, wherein, when the uplink signal is a RACH, the determined uplink Tx power corresponds to the following equation F $$P_{PRACH} = \min\{P_{CMAX,c}(i), \text{PREAMBLE\_RECEIVED\_TARGET\_POWER} + PL_c - \textit{offset}_{BS\_Diversity\_margin}\}$$ [Equation F]

wherein c indicates the index of the specific cell, i represents a subframe index, $P_{PRACH}$ is RACH Tx power in the subframe i of the specific cell c, PREAMBLE_RECEIVED_TARGET_POWER represents receive (Rx) power of a RACH preamble targeted by a BS, $PL_c$ is a downlink pathloss estimate calculated in dB by the terminal of the specific cell c, and $\textit{offset}_{BS\_Diversity\_margin}$ is the offset value.

* * * * *